(12) United States Patent
Sathaye et al.

(10) Patent No.: US 11,681,895 B2
(45) Date of Patent: Jun. 20, 2023

(54) COGNITIVE ASSISTANT WITH RECOMMENDATION CAPABILITY

(71) Applicant: KYNDRYL, INC., New York, NY (US)

(72) Inventors: Ninad Sathaye, Pune (IN); Rick A. Hamilton, II, Charlottesville, VA (US); Wouter Denayer, Merelbek (BE); Edgar A. Zamora Duran, Heredia (CR)

(73) Assignee: KYNDRYL, INC., New York, NY (US)

(*) Notice: Subject to any disclaimer, the term of this patent is extended or adjusted under 35 U.S.C. 154(b) by 1038 days.

(21) Appl. No.: 15/992,509

(22) Filed: May 30, 2018

(65) Prior Publication Data
US 2019/0370628 A1 Dec. 5, 2019

(51) Int. Cl.
*G06N 20/00* (2019.01)
*G06N 3/006* (2023.01)
*G06N 5/04* (2023.01)

(52) U.S. Cl.
CPC .............. *G06N 3/006* (2013.01); *G06N 5/04* (2013.01); *G06N 20/00* (2019.01)

(58) Field of Classification Search
CPC .......... G06N 3/006; G06N 20/00; G06N 5/04
See application file for complete search history.

(56) References Cited

U.S. PATENT DOCUMENTS

| | | |
|---|---|---|
| 8,670,979 B2 | 3/2014 | Gruber et al. |
| 8,892,446 B2 | 11/2014 | Cheyer et al. |
| 9,026,941 B1 * | 5/2015 | Krueger ............... H04L 67/10 715/963 |
| 9,098,606 B1 | 8/2015 | Chau et al. |
| 2003/0167167 A1 | 9/2003 | Gong |
| 2009/0077000 A1 * | 3/2009 | Begole ................ G06Q 10/10 706/54 |
| 2009/0288012 A1 * | 11/2009 | Hertel ................ G06Q 20/326 715/738 |

(Continued)

FOREIGN PATENT DOCUMENTS

WO 2016003509 1/2016

OTHER PUBLICATIONS

Bellotti et al. "Activity-Based Serendipitous Recommendations with the Magitti Mobile Leisure Guide" 2008, CHI '08: Proceedings of the SIGCHI Conference on Human Factors in Computing Systems.*

(Continued)

*Primary Examiner* — Jue Louie
(74) *Attorney, Agent, or Firm* — Erik Swanson; Andrew M. Calderon; Calderon Safran & Cole, P.C.

(57) ABSTRACT

Cognitive assistants which use feedback to highlight relevant points of interest to a user so that recommendations can be provided to the user based upon learned knowledge of the users preferences, tastes and customs are provided. For this purpose a computer-implemented method includes capturing user data of a user from a plurality of sensors, determining a cognitive state of the user from the captured data, correlating the user data to the cognitive state of the user, and making recommendations to the user based on the correlation of the user data and the determined cognitive state of the user.

20 Claims, 7 Drawing Sheets

(56) References Cited

U.S. PATENT DOCUMENTS

| | | | |
|---|---|---|---|
| 2011/0125678 A1* | 5/2011 | Partridge | G06Q 30/02 706/12 |
| 2012/0016678 A1 | 1/2012 | Gruber et al. | |
| 2013/0103624 A1* | 4/2013 | Thieberger | G06Q 10/063 706/12 |
| 2013/0110518 A1 | 5/2013 | Gruber et al. | |
| 2014/0099614 A1 | 4/2014 | Hu et al. | |
| 2015/0188756 A1* | 7/2015 | Amidei | H04L 41/0604 709/217 |
| 2015/0382147 A1 | 12/2015 | Clark et al. | |
| 2017/0255689 A1* | 9/2017 | Khatravath | G06F 16/9035 |
| 2017/0293851 A1* | 10/2017 | Chawla | G06N 5/048 |
| 2018/0112995 A1* | 4/2018 | Bortolussi | G01C 21/3476 |
| 2019/0205839 A1* | 7/2019 | Dotan-Cohen | G06Q 10/1093 |

OTHER PUBLICATIONS

Götz "MaskIt: Privately Releasing User Context Streams for Personalized Mobile Applications", 2012, SIGMOD '12: Proceedings of the 2012 ACM SIGMOD International Conference on Management of Data.*

Pessemier et al. "Context-aware recommendations through context and activity recognition in a mobile environment", 2014, Multimedia Tools and Applications vol. 72.*

Kumar et al. "Towards Activity Recommendation from Lifelogs", 2014, iiWAS '14: Proceedings of the 16th International Conference on Information Integration and Web-based Applications & Services.*

Lutz, "Nokia reveals new City Lens augmented reality app for Windows Phone 8 lineup", https://www.engadget.com/2012/09/11/nokia-reveals-new-city-lens-for-windows-phone-8/, Engadget, Sep. 11, 2012, 1 page.

Takeuchi et al., "CityVoyager: An Outdoor Recommendation System Based on User Location", http://link.springer.com/chapter/10.1007%2F11833529_64, Ubiquitous Intelligence and Computing. UIC 2006. Lecture Notes in Computer Science, vol. 4159. Springer, Berlin, Heidelberg, 10 pages.

Mamiit, "Android N New Features: Split-Screen Mode, Google Assistant, Instant Apps and More", http://www.techtimes.com/articles/159490/20160520/android-n-new-features-split-screen-mode-google-assistant-instant-apps-and-more.htm, Tech Times, May 20, 2016, 2 pages.

Painter, "How to use Proactive in iOS 9", https://www.macworld.co.uk/how-to/iosapps/how-use-proactive-siri-in-ios-9-virtual-assistant-3616319/, Macworld From IDG, Sep. 15, 2015, 5 pages.

Czibula et al., "IPA—An Intelligent Personal Assistant Agent For Task Performance Support", Intelligent Computer Communication and Processing, 2009. ICCP 2009. IEEE 5th International Conference, Aug. 27-29, 2009, 4 pages.

Santos et al., "Intelligent Personal Assistants Based on Internet of Things Approaches", IEEE Systems Journal, vol. 12, Issue: 2, May 19, 2016, 10 pages.

Mell et al., "The NIST Definition of Cloud Computing", NIST, Special Publication 800-145, Sep. 2011, 7 pages.

* cited by examiner

User: Joan Doe (id 123456)

| Day | Time | Weather | Activity | Activity preferences | Place | Place Type | Emotion/ Cognitive state (before) | Emotion/ Cognitive state (after) | Activity before | Activity after |
|---|---|---|---|---|---|---|---|---|---|---|
| Monday | 7:00AM-8:00AM | Any | Breakfast | Coffee, eggs | Restaurant XYZ | Restaurant | Happy(30%) | Happy (60%) | Drive | Work |
| Tuesday | 7:00AM-8:00AM | Any | Breakfast | Coffee, eggs | Restaurant XYZ | Restaurant | Happy(30%) | Happy (60%) | Drive | Work |
| Wednesday | 7:00AM-8:00AM | Sunny | Breakfast | Coffee, eggs | Restaurant XYZ | Restaurant | Happy(30%) | Happy (60%) | Drive | Work |
| | | Cloudy | Breakfast | Chocolate, pancakes | Restaurant ABC | Restaurant | Happy(30%) | Happy (70%) | Drive | Work |
| Thursday | 7:00AM-8:00AM | Any | Breakfast | Coffee, eggs | Restaurant XYZ | Restaurant | Happy(30%) | Happy (60%) | Drive | Work |
| Friday | 7:00AM-8:00AM | Any | Breakfast | Coffee, pancakes | Restaurant ABC | Restaurant | Happy(30%) | Happy (70%) | Drive | Classes |
| Monday-Friday | 5:00PM-6:00PM | Any | Massages | - | Spa ABC | Relax, Spa | Stressed(90%) Happy (30%) | Stressed(30%) Happy (50%) | Work meeting | Drive Home |
| Saturday-Sunday | 7:30AM-8:30AM | Cloudy | Jogging | Fresh air | Jogging track at the Park123 | Park | Happy(30%) | Happy (50%) | Sleep | Breakfast |
| | | Sunny | Biking | Mountain | Street | Street | Happy(30%) | Happy (70%) | Sleep | Breakfast |
| | | Rainy | Gym | Weights | Gym123 | Gym | Happy(30%) | Happy (50%) | Drive | Breakfast |

COGNITIVE ASSISTANT WITH RECOMMENDATION CAPABILITY

BACKGROUND

The present invention generally relates to cognitive assistants, also known as intelligent personal assistants, and, more particularly, to cognitive assistants which use feedback to highlight relevant points of interest to a user so that recommendations can be provided to the user based upon learned knowledge of the user's preferences, tastes and customs.

Intelligent personal assistants have, over recent years, become increasingly common. An intelligent personal assistant is a software agent that can perform tasks or services for an individual. These tasks or services are based on user input, location awareness, and the ability to access information from a variety of online sources (such as weather or traffic conditions, news, stock prices, user schedules, retail prices, etc.). In particular, cognitive assistants focus on delivering information needed by the user, at the time it's needed.

SUMMARY

In a first aspect of the invention, there is a computer-implemented method comprising capturing user data of a user from a plurality of data sources, determining a cognitive state of the user from the captured data, correlating the user data to the cognitive state of the user, and recommending an activity or a business to the user based on the correlation of the user data and the determined cognitive state of the user.

In another aspect of the invention, there is a computer program product including a computer readable storage medium having program instructions embodied therewith, the program instructions executable by a computing device to cause the computing device to: capture user data of a user from a plurality of data sources; preprocess the captured data to determine a cognitive state of the user and to provide preprocessed data regarding the cognitive state; correlate the preprocessed data with metadata regarding the captured data to identify habits, tastes and preferences of the user to create learned user preferences for places and activities; store the learned user preferences in a user activity database, identify emotions related to an activity and place, date and time associated with respective ones of the learned user preferences; rank the identified emotions to create ranked identified emotions; store the ranked identified emotions associated with the respective ones of the learned user preferences in the user activity database; retrieve a list of businesses and activities available proximate to the user; determine a user interest rank by correlating current data of the user, and the learned user preferences with the list of businesses and activities available proximate to the user; and recommend one or more of the existing businesses and activities based on the user interest rank.

In another aspect of the invention, there is system including a processor, a computer readable memory, and a computer readable storage medium, program instructions to capture user data of a user from a plurality of data sources, program instructions to determine a cognitive state of the user from the captured data, program instructions to correlate the user data to the cognitive state of the user to provide correlated data regarding user preferences, and program instructions to make recommendations to the user based on the correlation of the user data and the determined cognitive state of the user, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to cognitive assistants, also known as intelligent personal assistants, and, more particularly, to cognitive assistants which use feedback to highlight relevant points of interest to a user so that recommendations can be provided to the user based upon learned knowledge of the users habits, preferences, tastes and customs. Aspects of the present invention are directed to highlighting relevant points of interest by a cognitive assistant with wearable feedback. Implementations include providing arrangements to capture data from a set of sensors including a user mobile communication device, wearable sensors and personal information systems to create captured data, and preprocessing the captured data to determine a cognitive state and sentiments, places frequented, media playing and contacts adjacent a user to create preprocessed data.

Aspects of the present invention further include correlating the preprocessed data with metadata to identify habits, preferences, tastes and customs of the user to create learned user preferences for places and activities, storing the learned user preferences in a user activity database, identifying emotions related to an activity and place, date and time associated with respective learned user preferences, ranking the identified emotions to create ranked identified emotions, and storing the ranked identified emotions associated with the respective learned user preferences in the user activity database. In embodiments, a list of businesses and activities available proximate to the user is determined and current data of the user and the learned user preferences are correlated with the list of businesses and activities available proximate to the user to determine a user interest rank. Schedule availability for existing businesses and activities on the list of businesses and activities may then be determined, location availability and weather conditions for the existing businesses and activities on the list of businesses and activities are checked, and activities for the existing businesses and activities on the list of businesses and activities are ranked based on the user interest rank. Recommendations may then be provided to the user regarding one or more of the existing businesses and activities according to the user interest rank, or other predetermined criteria.

Aspects of the present invention are also directed to arrangements by which an intelligent personal assistant, or cognitive assistant, learns about user habits, preferences, tastes and customs, correlates these to their cognitive state, and, based on this knowledge, recommends activities or places near the user location, enabling better usage of time, money and overall personal satisfaction.

Unlike some conventional cognitive assistants, the cognitive assistant of embodiments of the present invention does not concentrate on primarily showing places which are highly recommended by others. Instead it recommends businesses related to learned habits, preferences, tastes and customs of the user. As such, the cognitive assistant creates personalized recommendations based on the learned data and current user data (location, time, cognitive state). To this end, the cognitive assistant gathers user data from different sources, such as wearables, social networks, user's calendar, bank account funds available, crowd sourced information on shops, etc. Also, unlike some conventional systems, the cognitive assistant of embodiments of the present invention not only learns the places frequented by the user but also learns habits, preferences, tastes and customs related to the user activities, by using the user's cognitive state (e.g., sensed emotions, mood, physical condition and tastes), time, day of the week and business characteristics.

Aspects of the present invention are also directed to a system that recommends businesses near a user's current location, based on day of the week, time, fund availability, crowd sourced information regarding places and identified cognitive states (e.g., emotion, mood, physical condition and tastes) conforming to the previously learned user interests, customs and tastes. Such learning is done by capturing user data, such as visited places, frequent activities, costs, and identified emotions during/before/after being in those places and doing those activities.

In embodiments, a system in accordance with the present invention includes a component that determines where the user is located (e.g., using Location Based Services (LBS)) and collects data on the user's activities (e.g., cognitive state, funds, date and time). The system may include a component that learns the user's interests and habits, correlating time of day, date, cognitive state and funds. The user's interests can be learned, for example, either purely from implication from the LBS, or by augmenting the LBS information via determination of cognitive state, emotions and mood from wearable data, gestures, posts and/or feedback. The user's interests also may be learned by augmenting the LBS by mining social media, e.g., for determining crowd source information, and/or user click streams, and/or by augmenting the LBS via a manual entry of rules. The system may further include a component to make suggestions of businesses near by the user's current location, based on date and time, with the suggestions conforming to the user's learned interests and habits.

As described above, an aspect of the invention is to provide embodiments which can learn by correlating places visited to a user's cognitive states during such visits. Then, current information, including activities, location and cognitive states, and learned information, based on previous activities, location and cognitive states, can be compared to make informed recommendations for current or future activities.

An advantage of embodiments of the present invention is that the system automatically learns user interests and customs for places and activities. In other words, there is no need for the user to provide constant manually input feedback. Further, personalized recommendations are made based on an enriched set of data, that is, the learned user interests and habits. Regarding this, it is noted that the cognitive state of the user (e.g., physical state, emotions, tastes and mood) can be gathered from wearables or social posts or feedback, which is an important component for the learning and recommending processes.

As an example of the cognitive assistant system in accordance with embodiments of the present invention, by utilizing data capture services in an automobile, it can be learned that a user stops for coffee every morning between 7:00 AM and 8:00 AM (e.g., by correlating time and the vehicle GPS location to a series of places of the same type). When the user drives to a different city, the system in accordance with embodiments of the present invention may make recommendations based on the learned interest in habits of the user. For example, the recommendation component can tell the user the locations of coffee shops between 7:00 AM and 8:00 AM, unless the user tells the cognitive assistant system that he or she is no longer interested, or the user is doing something that is not compatible with the user's normal activities at the particular time, as will be discussed below.

Another example of the cognitive assistant system in accordance with embodiments of the present invention is that a user's phone can learn that the user takes a bus from Monday through Friday at a station at 5:00 PM. However, the learning component also learns that if the user is stressed, and the station is very crowded, the user takes a taxi instead of a bus. The system is then able to read the date/time, as well as information from the users wearable devices, together with the bus station information regarding crowd size and related taxi stops so that a recommendation can be made to the user regarding taxi stops nearby the station when conditions sensed from the user's wearables and crowd source information indicate that the user is stressed and might be interested in taking a taxi.

In accordance with another aspect of the invention, prior to making a recommendation, the cognitive assistant system can determine that if a current activity is not compatible with an activity which it would otherwise recommend, the recommendation will not be made. For example, if the user is currently jogging at a time when the user would normally be going for coffee, the cognitive assistant system will notice the incompatibility of these two activities, and will not make the recommendation that it would normally make of going for coffee.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
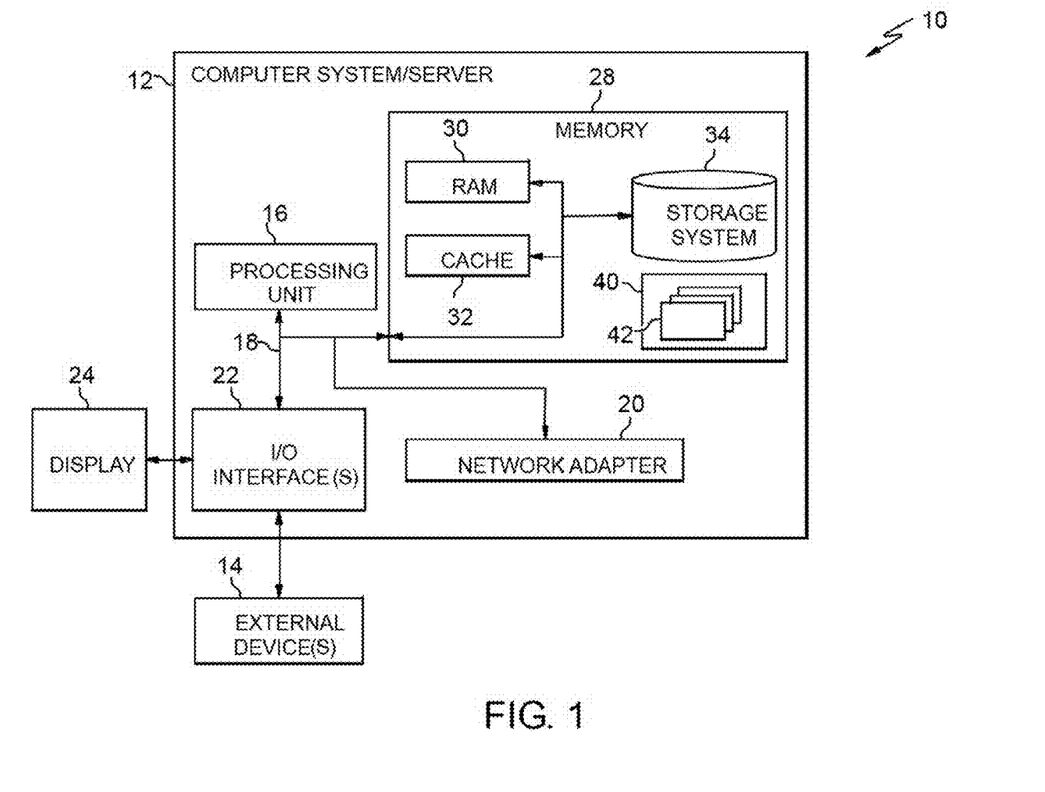
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
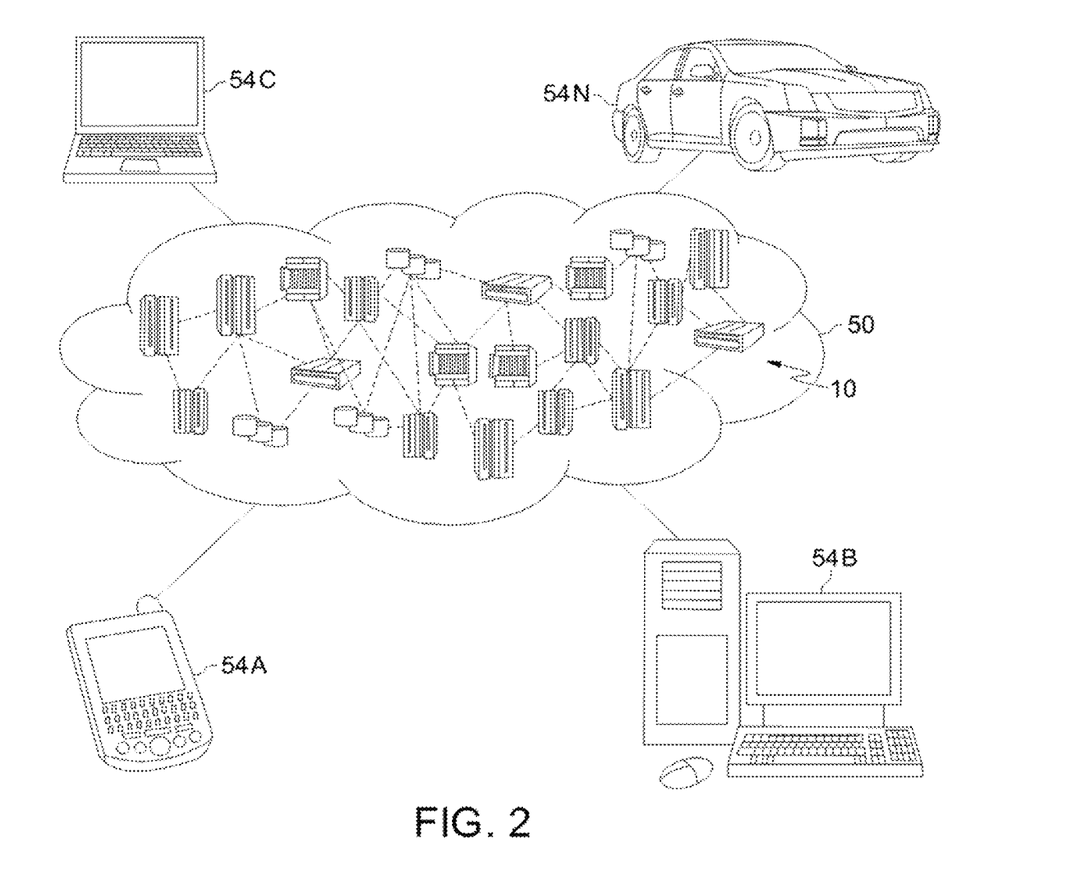
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
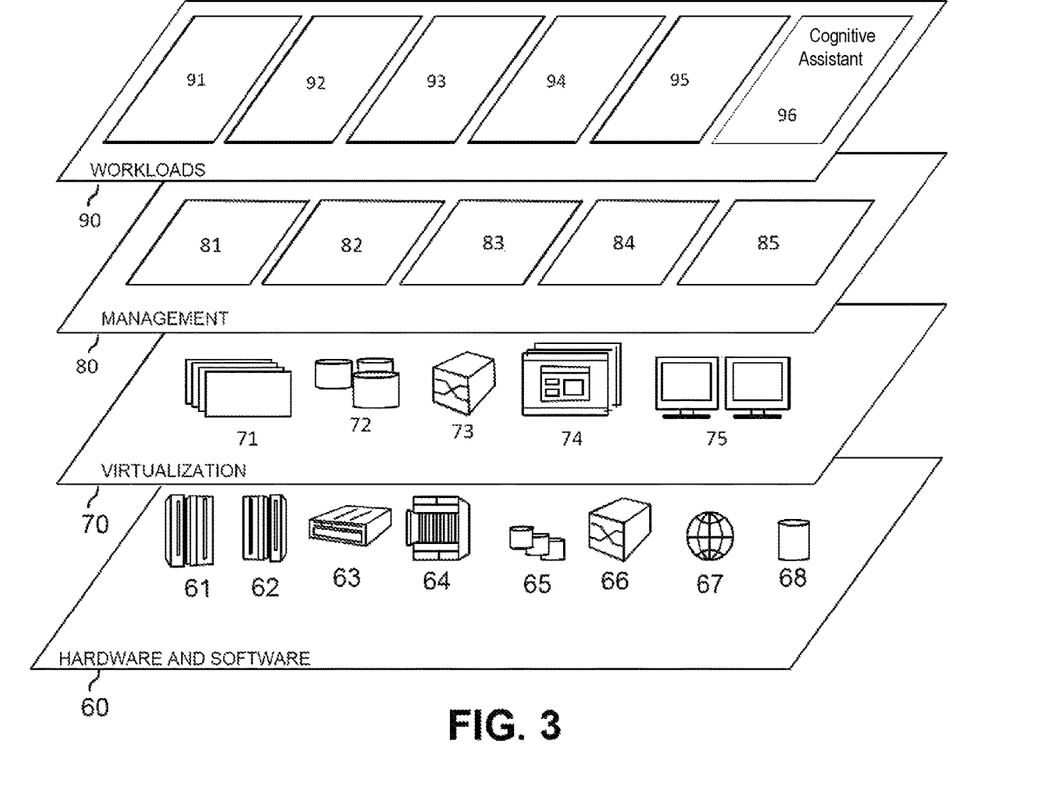
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive assistant 96.

Figure 4:
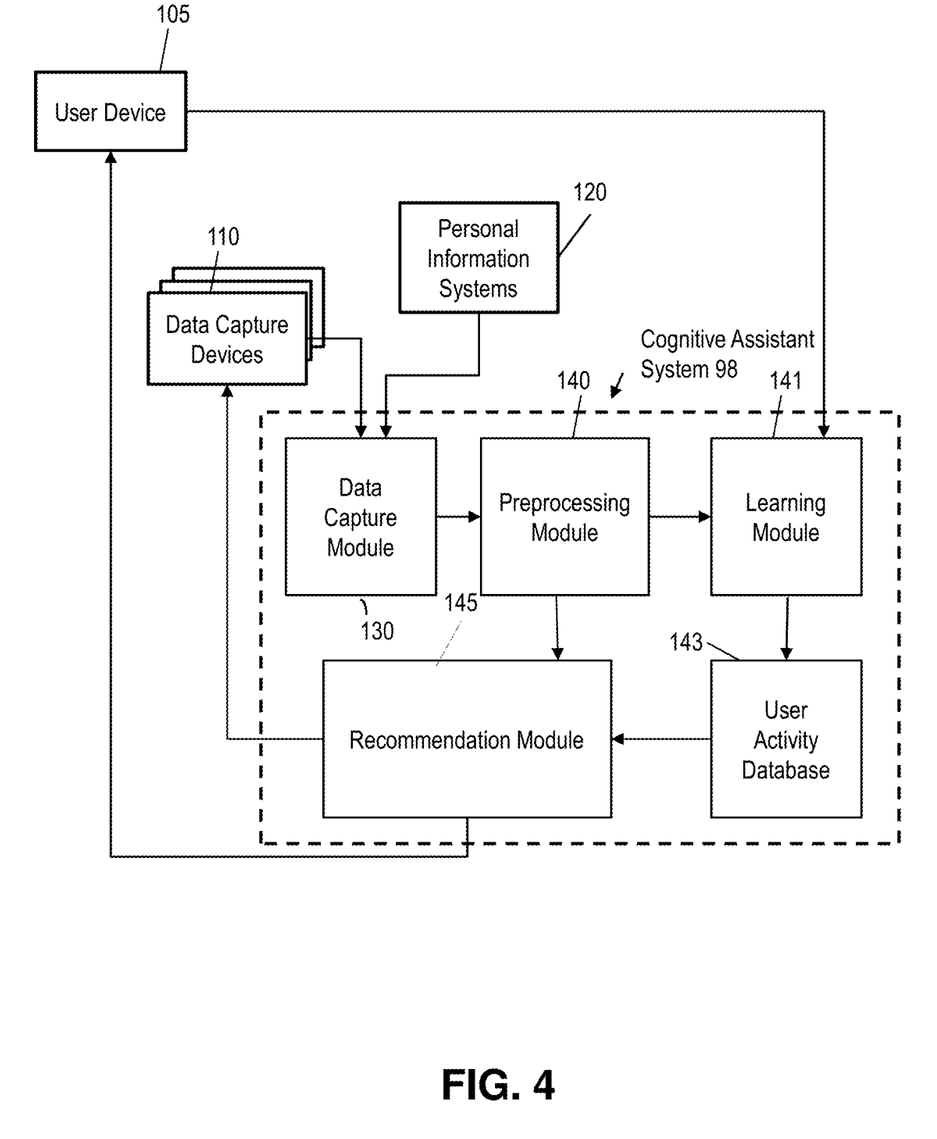
FIG. 4 shows a block diagram of an exemplary environment in accordance with aspects of the invention.

FIG. 4 shows a block diagram of an exemplary environment in accordance with aspects of the invention. In embodiments, the environment includes a cognitive assistant system 98, which performs functions of the cognitive assistant 96 of FIG. 3. In embodiments, the cognitive assistant system 98 includes a data capture module 130, a preprocessing module 140, a learning module 141, a user activity database 143 and a recommendation module 145.

With continued reference to FIG. 4, the cognitive assistant system 98 comprises a computer system that may include one or more elements of the computer system/server 12 of FIG. 1. In accordance with aspects of the invention, the cognitive assistant system 98 includes the data capture module 130, the preprocessing module 140, the learning module 141 and the recommendation module 145, each of which may comprise one or more program modules such as program modules 42 of FIG. 1. In embodiments, the modules of the cognitive assistant system 98 can be part of the workloads in the abstraction model layers described with respect to FIG. 3. Aspects of the invention are not limited to the exact number of modules shown in FIG. 4, and fewer modules may be used by combining the functionality of one or more modules into another module. Conversely, more modules may be employed by splitting the functionality of one or more of the modules shown into plural different modules.

The embodiment shown in FIG. 4 also includes a user device 105, such as a user smart phone, tablet computer, smart watch, etc., that is coupled to receive recommendations from the recommendation module 145 regarding activities and places (e.g., businesses) recommended to the user device 105 by the cognitive assistant system 98, as will be discussed herein. In embodiments, the user device 105 also provides information to the learning module 141, such as feedback on recommendations provided by the cognitive assistant system 98.

In embodiments, the data capture module 130 receives inputs from various data capture devices 110, which can include wearables (e.g., for determining GPS location, date, time and information from various sensors regarding a user wearing the wearables) and other personal information systems 120 which can provide information regarding, for example, agenda, contacts, social media activity and click streams. The personal information systems 120 can include a personal calendar and banking information regarding a user. The captured user data can relate to user routines and the cognitive state can relate to how the user feels at least one of before, during and after activities of the user routines. This captured data relating to user routines and the cognitive states, obtained from the data capture devices 110 and the data from the personal information systems 120, is provided to the preprocessing module 140.

In embodiments, the preprocessing module 140 determines cognitive states, including emotions and sentiments, for example, from data received from the data capture module 130, e.g., using conventional cognitive computing techniques. This data may include, for example, users posts and measurements taken from wearables of the user, as well as place information (e.g. from GPS locations and posts), media playing (if available, for example, by using media identification services) and contacts near the user at the time (e.g., from the user contacts' GPS locations and posts). Data from the preprocessing module 140, for example, date, time, identified emotions, places and activities, is then provided to the learning module 141 and the recommendation module 145.

In embodiments, the learning module 141 receives the preprocessed data from the preprocessing module 140, and, using cognitive analysis, identifies emotions related to an activity and metadata regarding the activity, such as place, date and time, to provide correlated data which identifies user preferences regarding activities and places. In embodiments, the learning module 141 can also rank the emotions as well as the learned user preferences, and may then store this information in the user activity database 143. These learned user preferences may relate to the preferences of the user for places and activities, based on the emotions, likes and dislikes provided by the preprocessing module 140.

In embodiments, the recommendation module 145 may receive the learned user preferences, and their ranking from the learning module 141 the preprocessing module 140, and uses this information to provide recommendations to the user device 105. Specifically, the recommendation module 145 recommends nearby businesses and activities to a user based on the user likes and habits, as determined by the learned user preferences stored in the user activity database 143, as well as calendar availability, contacts availability and budget as will be discussed below.

In aspects of the invention, the learning module 145 identifies the likes, tastes and habits of the user, for example, by using cognitive analysis of the data provided by the preprocessing module 140, to determine user preferences which are then stored in the user activity database 143, for subsequent use by the recommendation module 145. It is noted that the data capture module 130 may capture location data, such as traffic conditions, weather forecasts, temperature, GPS location and media playing, as well as user data, as determined by body sensors (e.g., temperature and heart rate), recent social media posts, and transportation. The current data also provided to the data capture module 130 can include schedule and fund availability, for example, from the personal information systems 120, including, but not limited to, personal and business calendar information to determine user availability, as well as funds and budget information provided by the user or directly from authorized accounts.

The preprocessing module 140, as noted above, preprocesses the current data provided by the data capture module 130, to identify current place location and place type (e.g., the office, gym, grocery store, restaurant, etc.) as well as the current activity (e.g., lunch, breakfast, work, sport, massage, etc.). Activities before and after the current activity can also be identified by the preprocessing module 140. The learning module 141 then correlates the data from the preprocessing module 140 with metadata, such as date and time regarding the captured data, to determine user habits, tastes and preferences (i.e., learned user preferences) regarding the various activities in question.

In embodiments, the cognitive assistant system 98 can comprise, or be part of, a cloud computing environment, such as cloud computing environment 50 of FIG. 2. In this embodiment, each of the elements such as the data capture module 130, the preprocessing module 140, the learning module 141, the user activity database 143 and the recommendation module 145 comprises a respective cloud computing node such as cloud computing nodes 10 of FIG. 2, coupled for communication through the cloud network 150 to the data capture devices 110, the personal information systems 120 and the user device 105. On the other hand, these elements can also be implemented in a user device 105 itself, i.e., on the user's smart phone or other computing device.

Figure 5:
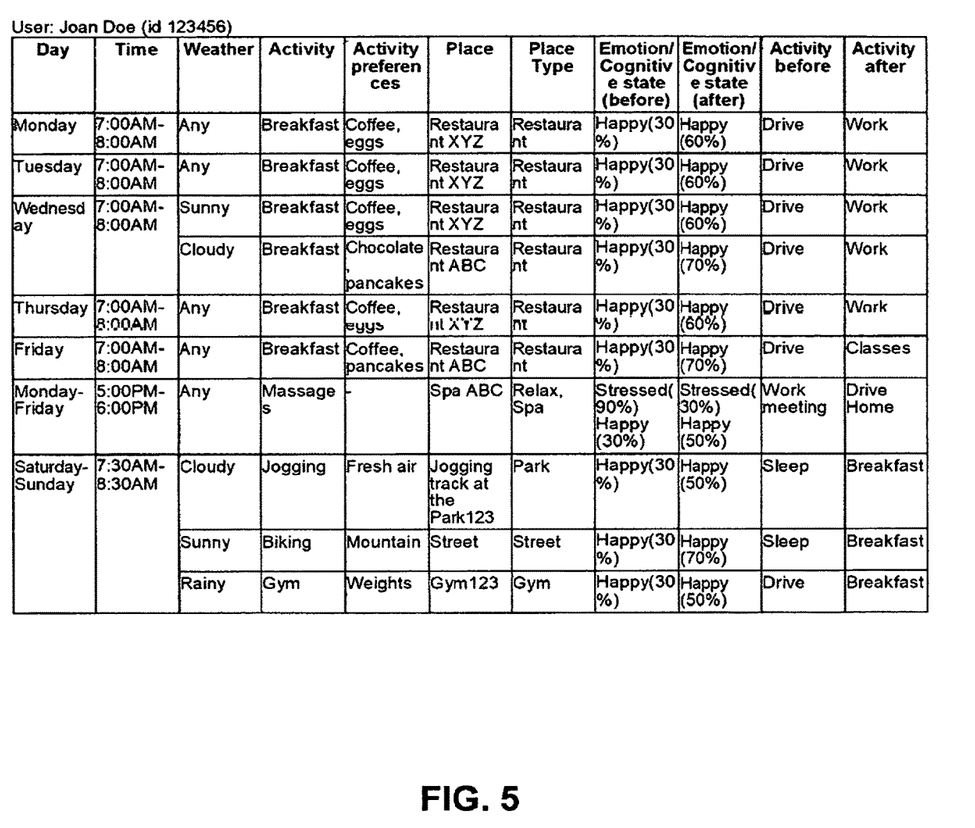
FIG. 5 shows examples of the output of the learning module of FIG. 4 regarding the learned habits and likes of a user in accordance with aspects of the invention.

FIG. 5 shows examples of outputs from the learning module 141 of FIG. 4 with regard to the learned habits and likes of a user. As can be seen, the information provided and stored in the user activity database 143 may include the date, time, weather conditions, the current activity, activity preferences, the specific place, the place type, the emotional/cognitive state before the activity, the emotional/cognitive state after activity, the activity performed before the current activity and the activity performed after the current activity. This stored information regarding preferred user preferences is then used in conjunction with the recommending process, as discussed below.

It is noted that the columns in FIG. 5 regarding emotion/cognitive state can be determined by a cognitive state computing system configured to determine a user's emotional states from received data from data capture devices 110 and personal information systems 120 shown in FIG. 4, including sensors, mining social data, etc. As such, the information shown in the columns in FIG. 5 establish whether the user is more or less happy after an activity or more or less stressed after an activity. This information can be used in the learning module 141 to determine and rank emotions for use in making future recommendations.

Figure 6:
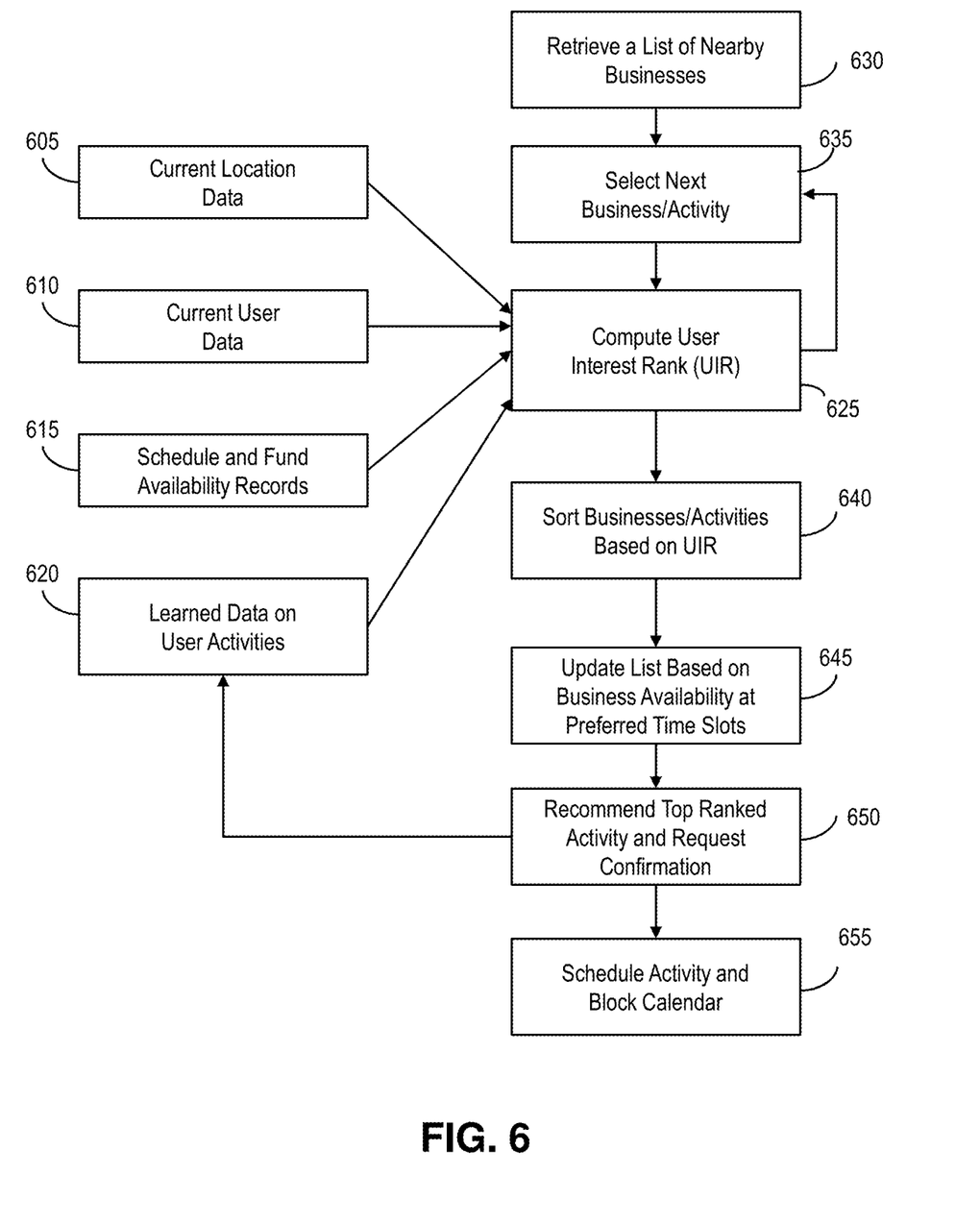
FIG. 6 shows a block diagram of an exemplary embodiment of the present invention.

FIG. 6 shows a block diagram of an exemplary embodiment of the invention, particularly with regard to the recommending process, performed, for example, by the recommendation module 145 of FIG. 4. In embodiments, the recommendation module 145 determines a user interest rank (UIR) at step 625 based on input data such as current location data 605, current user data 610, schedule and fund availability records 615 and learned data on user activities 620. The current location data 605 can include, for example, traffic conditions and weather forecasts, as well as location, time, and current weather data, such as temperature, humidity, wind speed, precipitation, etc. The current user data 610 can include body sensor data, such as temperature and heart rate determined, for example, from wearable computer devices having appropriate sensors. The current user data can also include data with regard to the user's commute (current or planned) regarding the present location, and, in particular, the user mode of commuting, such as walking, jogging, riding a bike, driving a car, taking a taxi or bus, etc. The current location data 605 and the current user data 610 can be determined from data capture devices 110, such as shown in FIG. 4 which are provided to a data capture module 130 which can then be provided to the recommendation module 145 via the preprocessing unit 140, the learning module 141 and the user activity database 143 shown in FIG. 4.

The schedule and fund availability records 615 can be provided, for example, from personal information systems 120 shown, for example, in FIG. 4. This can include personal and business calendar information, such as availability for today, tomorrow, within a week, within a month, within a year, specific dates (including holidays), configurable periods, funds on authorized card/bank accounts or funds specifically budgeted by the user for specific purposes. It is noted that the computing of the UIR 625 can be performed, for example, in the recommendation module 145 of FIG. 4.

In addition to utilizing the current location data 605, the current user data 610, the schedule and fund availability records 615 and the learned data on user activities 620, step 625 of computing the UIR may also include retrieving a list of nearby businesses 630. This retrieval can be done serially, by repeated selection of the next business/activity in step 635 from the list of nearby businesses, or by parallel processing of the list from step 630 to step 625. The user or a system administrator can set the relative distances from the user to provide parameters with regard to which businesses are regarded as nearby businesses. Also, the UIR can be calculated in step 625 with an appropriate compound algorithm, including a weighting algorithm, if desired, taking into account the current location data 605, the current user data 610, the schedule and fund availability records 615 and the learned data on user activities 620, particularly with regard to learned user preferences, such as stored, for example, in the user activity database 143 of FIG. 4.

Once a UIR has been determined in step 625, the recommendation module 145 sorts the businesses and activities based on this UIR in step 640. In step 645, the recommendation module 145 updates the list of sorted businesses based on information determined with regard to business availability at preferred time slots for the particular user. For example, the preferred time slots can be determined from the user scheduling information determined in step 615. Once the updated list based on business availability at preferred time slots is determined, the recommendation module 145 provides recommendations regarding top ranked activities to the user device 105 in step 650, together with a request for confirmation from the user device 105. These recommendations can also be provided to the learning module 141 of FIG. 4, as shown by the feedback connection between the step 650 (performed in the recommendation module 145 of FIG. 4) and the step 620 (performed in the learning module 141 and FIG. 4), so that the learning module 141 can take these recommendations, and the requested confirmation, into account in updating user preferences determined by the learning module 141 of FIG. 4. It is noted that the steps 630, 635, 640, 645, 650 of 655 can all be performed, for example, by the recommendation module 145 shown in FIG. 4.

In step 655, the user device 105 shown in FIG. 4 schedules the recommendations regarding top ranked activities for the user and provided in a calendar block. Confirmation information from the user can also be provided in step 655, and, if desired, the scheduling and calendar blocking information can be temporarily held in abeyance until confirmation is received from the user.

Figure 7:
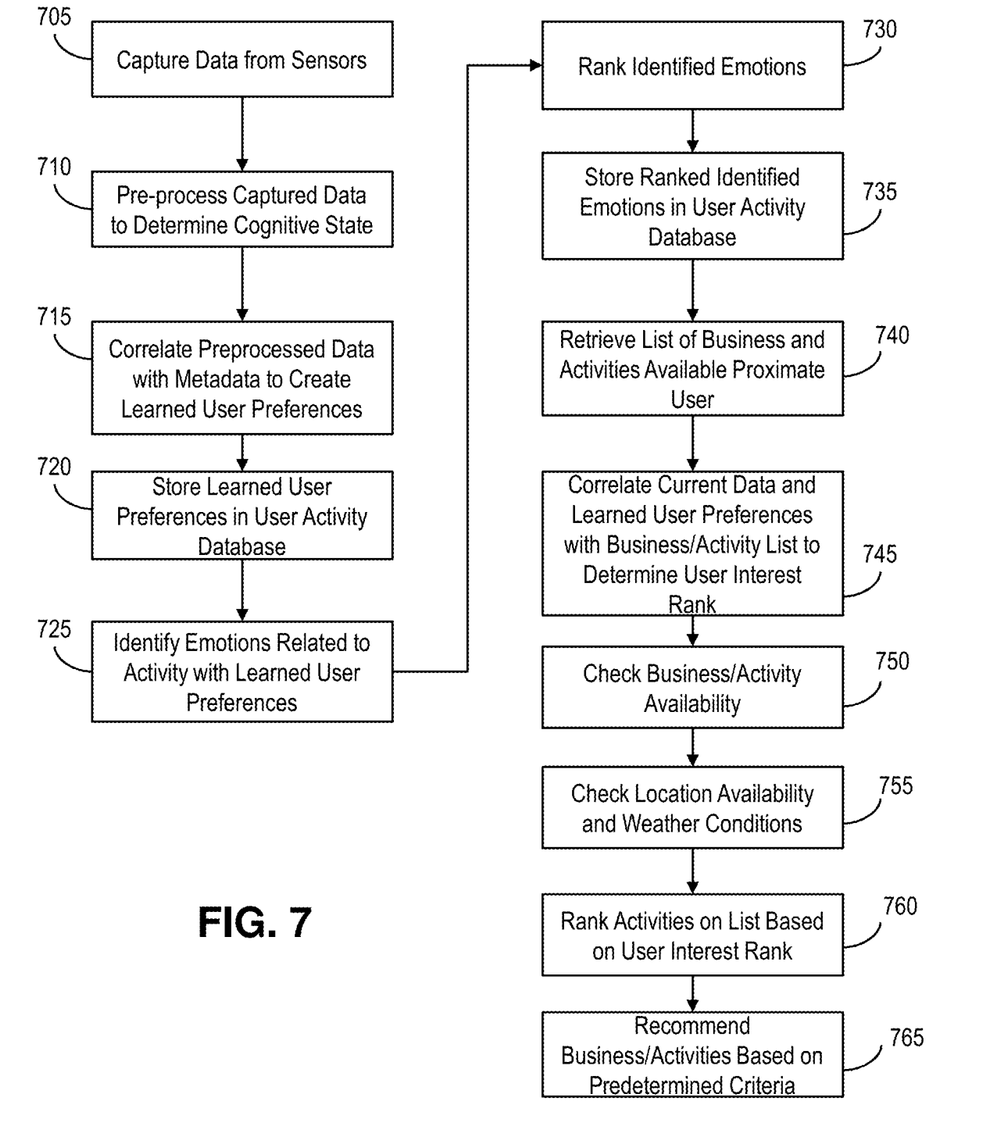
FIG. 7 shows a flowchart of an exemplary method in accordance with aspects of the invention.

FIG. 7 shows a flowchart of a method in accordance with aspects of the present invention, utilizing the exemplary environment shown in FIG. 4, and the recommendation process shown in FIG. 6. At step 705, sensors capture data, for example, via data capture devices 110 and data capture module 130 of the cognitive assistant system 98 shown in FIG. 4. In step 710, the captured data is preprocessed to determine a cognitive state, for example, in the preprocessing module 140 shown in FIG. 4. In step 715, the preprocessed data is then correlated with metadata to create learned user preferences, for example, in the learning module 141 shown in FIG. 4. This metadata can include time and date regarding the captured data, has previously discussed.

At step 720, the learning module 141 stores learned user preferences in a user activity database 143. In addition, the learning module 141 identifies emotions related to activities with the learned user preferences in step 725, and ranks these emotions in step 730. The ranked emotions can also be stored in the user activity database 143 in the step 735.

At step 740, the data capture module 135 provides a list of businesses and activities available proximate to the user. The distance regarded as proximate to the user can be set by the user, or by a system administrator, as desired. The determination of the distance regarded as proximate to the user can also be based on learned user preferences determined by the learning module 141 and stored in the user activity database 143. This can be done, for example, by noting how far the user is generally willing to travel for specific activities.

At step 745, the recommendation module 145 shown in FIG. 4 correlates the current data and the user preferences from the user activity database 143 with the business/activity list to determine the user interest rank (UIR), corresponding to the process discussed above with regard to the step 625 shown in FIG. 6. In step 750, business/activity availability at preferred time slots is determined, corresponding, for example, to step 645 for updating the business/activity list shown in FIG. 6.

At step 755, the data capture devices determine location availability and weather conditions, either currently or at some future time. At step 760, the businesses and activities on the list are ranked based on the user interest rank, as well as the business/activity availability in the preferred time slots and the location availability and weather conditions determined, respectively, in steps 750 and 755. Once this ranking is provided, the recommendation module 145 recommends businesses and activities to the user device 105 in step 765 based on predetermined criteria, generally the user interest rank determined in step 760. However, if desired, additional predetermined criteria can be provided, for example, by the user, or a third party, or some other source to provide adjustments regarding the recommendations.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   capturing, by a computer device, user data of a user from a plurality of data sources including heart rate and temperature measurements from physical wearable sensors on the user and social media activity and crowd sourced information from a social network of the user;
   determining, by the computer device, a state including emotions based on the heart rate and temperature measurements from the physical wearable sensors on the user and sentiments based on the social media activity and the crowd sourced information from the social network of the user in the captured data;
   correlating, by the computer device, the user data including user preferences regarding an activity to the determined state of the user, the activity being within a predetermined distance from the user;
   determining, by the computer device, a current activity of the user using the user data and whether the current activity of the user is compatible with the activity which would be recommended;
   recommending the activity, by the computer device, to the user based on the correlation of the user data including the user preferences regarding the activity and the determined state of the user in response to determining compatibility between the current activity and the recommended activity; and
   scheduling, by the computer device, the user for the recommended activity by blocking a calendar of the user,
   wherein the predetermined distance from the user is determined by the user preferences which corresponds with a distance which the user is most likely to travel for activities.

2. The method of claim 1, wherein the user data relates to user routines and the determined state of the user relates to how the user feels before, during and after activities of the user routines.

3. The method of claim 1, further comprising:
   ranking, by the computer device, recommendations based on the correlation of the user data and the determined state of the user; and
   providing, by the computer device, a request for confirmation of the ranked recommendations.

4. The method of claim 1, wherein correlating the user data and the determined state of the user includes determining locations and times associated with the user data, the emotions of the user, and funds associated with the user.

5. The method of claim 1, wherein the plurality of data sources include at least one selected from the group consisting of: wearable sensors, a social network, a calculator, bank account information and crowd sourced information.

6. The method of claim 5, wherein the determined state of the user further includes moods and tastes of the user.

7. The method of claim 1, wherein the user data is collected using location-based services (LBS).

8. The method of claim 7, wherein the user data collected by the LBS is augmented by mining social data, click streams of the user, and via a manual entry of rules.

9. A computer program product, the computer program product comprising a computer readable storage medium having program instructions embodied therewith, the program instructions executable by a computing device to cause the computing device to:
   capture user data of a user from a plurality of data sources including heart rate and temperature measurements from physical wearable sensors on the user and social media activity and crowd sourced information from a social network of the user;
   preprocess the captured data to determine a state including emotions based on the heart rate and temperature measurements from the physical wearable sensors on the user and sentiments based on the social media activity and the crowd sourced information from the social network of the user and to provide preprocessed data regarding the determined state of the user;
   correlate the preprocessed data with metadata regarding the captured data to identify habits, tastes and preferences of the user to create learned user preferences for places and activities;
   store the learned user preferences in a user activity database;
   identify emotions related to an activity and place, date and time associated with respective ones of the learned user preferences, the activity being within a predetermined distance from the user;
   rank the identified emotions to create ranked identified emotions;

store the ranked identified emotions associated with the respective ones of the learned user preferences in the user activity database;
retrieve a list of businesses and activities available proximate to the user;
determine a user interest rank by correlating current data of the user, and the learned user preferences with the list of businesses and activities available proximate to the user;
determine a current activity of the user using the current data of the user and whether the current activity of the user is compatible with one or more activities which would be recommended;
recommend the one or more activities based on the user interest rank in response to determining compatibility between the current activity and the recommended one or more activities;
request confirmation from the user to schedule the recommended one or more activities; and
block a calendar of the user for the recommended one or more activities in response to receiving the confirmation from the user,
wherein the predetermined distance from the user is determined by the learned user preferences which corresponds with a distance which the user is most likely to travel for the activities.

10. The computer program product of claim 9, wherein the plurality of data sources include a user mobile communication device, a wearable sensor and a personal information system.

11. The computer program product of claim 10, wherein the preprocessing to create preprocessed data further includes determining places frequented using GPS locations and posts, media playing using media identification services, and contacts adjacent a user to create preprocessed data using the GPS locations of the contacts.

12. The computer program product of claim 11, wherein capturing data further includes determining the user's schedule and fund availability.

13. The computer program product of claim 11, wherein the program instructions further include program instructions executable by the computing device to cause the computing device to:
check schedule availability for existing businesses and activities on the list of businesses and activities; and
check location availability and weather conditions for the existing businesses and activities on the list of businesses and activities.

14. A system comprising:
a processor, a computer readable memory, and a computer readable storage medium;
program instructions to capture user data of a user from a plurality of data sources including heart rate and temperature measurements from physical wearable sensors on the user and social media activity and crowd sourced information from a social network of the user;
program instructions to determine a state including emotions based on the heart rate and temperature measurements from the physical wearable sensors on the user and sentiments based on the social media activity and the crowd sourced information from the social network of the user in the captured data;
program instructions to correlate the user data including user preferences regarding an activity to the determined state of the user to provide correlated data regarding user preferences the activity being within a predetermined distance from the user;
program instructions to determine a current activity of the user using the user data and whether the current activity of the user is compatible with the activity which would be recommended;
program instructions to recommend the activity to the user based on the correlation of the user data including the user preferences regarding the activity and the determined state of the user in response to determining compatibility between the current activity and the recommended activity;
program instructions to request confirmation from the user to schedule the recommended activity; and
program instructions to block a calendar of the user for the recommended activities in response to receiving the confirmation from the user,
wherein the program instructions are stored on the computer readable storage medium for execution by the processor via the computer readable memory, and
the predetermined distance from the user is determined by the user preferences which corresponds with a distance which the user is most likely to travel for activities.

15. The system of claim 14, further comprising a user activity database that stores the correlated data, the user preferences, and a ranking of the emotions.

16. The system of claim 15, wherein the user data relates to a user routine and the determined state of the user relates to how the user feels before, during and after activities of the user routine.

17. The system of claim 14, wherein the plurality of data sources includes the physical wearable sensors, the social network, a calculator, bank account information and the crowd sourced information.

18. The system of claim 17, wherein the user data is collected using a location-based services (LBS).

19. The system of claim 18, wherein the user data collected by the LBS is augmented by mining social data and click streams of the user.

20. The method of claim 1, wherein the distance which the user is most likely to travel for the activities is how far the user is willing to travel for the activities based on the learned user preferences.

* * * * *